United States Patent
Miller et al.

(10) Patent No.: US 10,102,616 B2
(45) Date of Patent: Oct. 16, 2018

(54) METHOD AND SYSTEM FOR SURFACE WEAR DETERMINATION

(71) Applicant: ENT. SERVICES DEVELOPMENT CORPORATION LP, Houston, TX (US)

(72) Inventors: Joseph Miller, Boulder, CO (US); Jonathan David Gibson, Austin, TX (US); Allen J. Chon, Sammamish, WA (US)

(73) Assignee: Ent. Services Development Corporation LP, Houston, TX (US)

( * ) Notice: Subject to any disclaimer, the term of this patent is extended or adjusted under 35 U.S.C. 154(b) by 0 days.

(21) Appl. No.: 15/114,685

(22) PCT Filed: Jan. 28, 2014

(86) PCT No.: PCT/US2014/013415
§ 371 (c)(1),
(2) Date: Jul. 27, 2016

(87) PCT Pub. No.: WO2015/116036
PCT Pub. Date: Aug. 6, 2015

(65) Prior Publication Data
US 2016/0343126 A1 Nov. 24, 2016

(51) Int. Cl.
*G06T 7/00* (2017.01)
*G06Q 30/02* (2012.01)
(Continued)

(52) U.S. Cl.
CPC .......... *G06T 7/0006* (2013.01); *B60C 11/246* (2013.01); *G01B 11/22* (2013.01);
(Continued)

(58) Field of Classification Search
CPC ........ G06T 7/0006; G06T 2207/30164; G01B 11/22; G01B 11/24; B60C 11/246;
(Continued)

(56) References Cited

U.S. PATENT DOCUMENTS

| 6,028,508 A | 2/2000 | Mason | |
|---|---|---|---|
| 2002/0036039 A1* | 3/2002 | Shimura | B60C 11/24 152/154.2 |

(Continued)

FOREIGN PATENT DOCUMENTS

| CN | 101762241 | 6/2010 |
|---|---|---|
| CN | 102141385 | 8/2011 |

(Continued)

OTHER PUBLICATIONS

Baratis Evdoxios, "Automatic Logo and Trademark Extraction from Large Corporate Web Sites," 2005, Dissertation Thesis, <http://www.intelligence.tuc.gr/lib/downloadfile.php?id=247>.

(Continued)

*Primary Examiner* — Amandeep Saini
(74) *Attorney, Agent, or Firm* — Sheppard Mullin Richter & Hampton LLP (57) ABSTRACT

Implementations of the present disclosure provide a method and system for surface wear determination. According to one implementation, an image of an object surface is captured via an input device. A surface pattern is detected from the captured image and object data associated with the object surface is identified based on the detected pattern. Additionally, a surface wear value of the object surface is determined based on the object data and surface pattern.

17 Claims, 7 Drawing Sheets

(51) Int. Cl.
| | |
|---|---|
| *G01M 17/02* | (2006.01) |
| *B60C 11/24* | (2006.01) |
| *G01B 11/22* | (2006.01) |
| *G01B 11/24* | (2006.01) |
| *B60C 19/00* | (2006.01) |

(52) U.S. Cl.
CPC ...... *G01M 17/027* (2013.01); *G06Q 30/0251* (2013.01); *B60C 2019/004* (2013.01); *G01B 11/24* (2013.01); *G06Q 30/0207* (2013.01); *G06T 2207/30164* (2013.01)

(58) Field of Classification Search
CPC ........... B60C 2019/004; G01M 17/027; G06Q 30/0251; G06Q 30/0207
USPC ......................................................... 382/108
See application file for complete search history.

(56) References Cited

U.S. PATENT DOCUMENTS

| | | | |
|---|---|---|---|
| 2012/0207340 A1* | 8/2012 | Bulan | G01M 17/027 382/100 |
| 2013/0045751 A1 | 2/2013 | Chao et al. | |

FOREIGN PATENT DOCUMENTS

| | | | |
|---|---|---|---|
| EP | 2141476 | | 1/2010 |
| JP | 2004224227 A | | 8/2004 |
| JP | 2009107484 A | * | 5/2009 |
| JP | 2009107484 A | | 5/2009 |
| JP | 2011226971 A | | 11/2011 |
| WO | WO2013045594 | | 4/2013 |

OTHER PUBLICATIONS

Dean Takahashi, "How Google Goggles works to deliver visual search results for mobile phones," Aug. 23, 2010, <http://venturebeat.com/2010/08/23/how-google-goggles-works-to-deliver-visual-search-results-for-mobile-phones/>.

Jeff Salton, "What's in a name? Google Goggles lets you search the web with pictures," Dec. 8, 2009, <http://www.gizmag.com/google-goggles-picture-searching/13551/>.

Mark Milian, "How Google is teaching computers to see," Apr. 15, 2011, <http://www.cnn.com/2011/TECH/innovation/04/14/google.goggles/>.

MengXiang et al., "What is the algorithm used by Google's reverse image search (i.e. search by image)?," Jun. 5, 2012-Aug. 31, 2014, <https://www.quora.com/What-is-the-algorithm-used-by-Googles-reverse-image-search-i-e-search-by-image>.

Milan Broum, "Open your eyes: Google Goggles now available on iPhone in Google Mobile App," Oct. 5, 2010, <http://googlemobile.blogspot.com/2010/10/open-your-eyes-google-goggles-now.html>.

Nathan Chandler, "What is Google Goggles?," Jul. 3, 2012, <http://electronics.howstuffworks.com/gadgets/other-gadgets/google-goggles.htm/printable>.

Shah et al., "Handwritten Character Recognition using Radial Histogram," International Journal of Research in Advent Technology, vol. 2, No. 4, Apr. 2014, <http://www.ijrat.org/downloads/april-2014/paper%20id-24201433.pdf>.

Thaker et al., "Structural Feature Extraction to recognize some of the Offline Isolated Handwritten Gujarati Characters using Decision Tree Classifier," International Journal of Computer Applications, vol. 99, No. 15, Aug. 2014, <http://research.ijcaonline.org/volume99/number15/pxc3898381.pdf>.

Belongie et al., "Shape Matching and Object Recognition Using Shape Contexts," Apr. 2002, IEEE Transactions on Pattern Analysis and Machine Intelligence, vol. 24, No. 24., pp. 509-522.

Takacs et al., "Fast Computation of Rotation-Invariant Image Features by an Approximate Radial Gradient Transform," Aug. 2013, IEEE Transactions on Image Processing, vol. 22, No. 8, pp. 2970-2982.

Zhu et al., "Automatic Document Logo Detection," 2007, ICDAR 2007, Ninth International Conference on Document Analysis and Recognition, vol. 2., <http://www.umiacs.umd.edu/~zhugy/LogoDetection_ICDAR2007.pdf>.

Huang, D-Y. et al.; "Recognition of Tire Tread Patterns Based on Gabor Wavelets and Support Vector Machine" 2010; 10 pages.

PCT Search Report/Written Opinion—Application No. PCT/US2014/013415 dated Oct. 29, 2014—15 4 pages.

* cited by examiner

METHOD AND SYSTEM FOR SURFACE WEAR DETERMINATION

BACKGROUND

The continuous rise in population and job growth, particularly within large metropolitan areas, has led to more and more commuters traversing roads and busy freeways. Today, millions of cars and trucks are driven thousands of miles throughout the year within a myriad of weather conditions. Along with engine reliability, vehicular tires are critical components towards the safety performance of the vehicle while in transit. As these tires become more worn over time and its treading nears the wear bars ($\frac{2}{32}^{nd}$ of an inch above the tread), continued driving without replacing the tires can be hazardous and potentially lead to an unavoidable accident. Consequently, it is imperative that the surface wear of tires and similar materials are properly assessed prior to use.

BRIEF DESCRIPTION OF THE DRAWINGS

The features and advantages of the present disclosure as well as additional features and advantages thereof will be more clearly understood hereinafter as a result of a detailed description of implementations when taken in conjunction with the following drawings in which.

DETAILED DESCRIPTION OF THE INVENTION

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one implementation, and not intended to intimate that the scope of the disclosure, including the claims, is limited to that implementation. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Prior solutions for measuring surface wear conditions, such as tire treading; only measure tread depth through use of a manual process that includes visual check/reading via the naked eye. For example, a user may insert a coin, thin ruler or gauge in between tire treads of a vehicle in an attempt to measure tread depth. Another prior solution requires that the vehicle tire is driven onto a pliable material where a tire imprint is left on that material for manual inspection. However, this solution is highly labor-intensive and time-consuming, and the only information gleaned from the lengthy process is the tire tread depth. Still other solutions utilized super-positioning techniques of before and after images to determine surface wear. However, this solution requires significant processing steps including matching imaging angles, and often results in inaccurate detection and wear measurement.

Implementations of the present disclosure provide a method and system for determining the surface wear of an object. According to one example. The system helps automate the process of determining baselines and surface wear (e.g., tire) through use of an input device such as a camera. In accordance with one implementation, the image or video taken by the device is transferred to the host server (e.g., cloud service provider) where the image is processed using morphology algorithms for pattern matching, while the orientation and pattern are used to identify the object and measure the surface wear. Based on the tire wear pattern, the present configuration can provide a surface wear value in conjunction with targeted marketing for other vehicle products and services (e.g., loyalty and reward programs and marketing campaigns).

Figure 1:
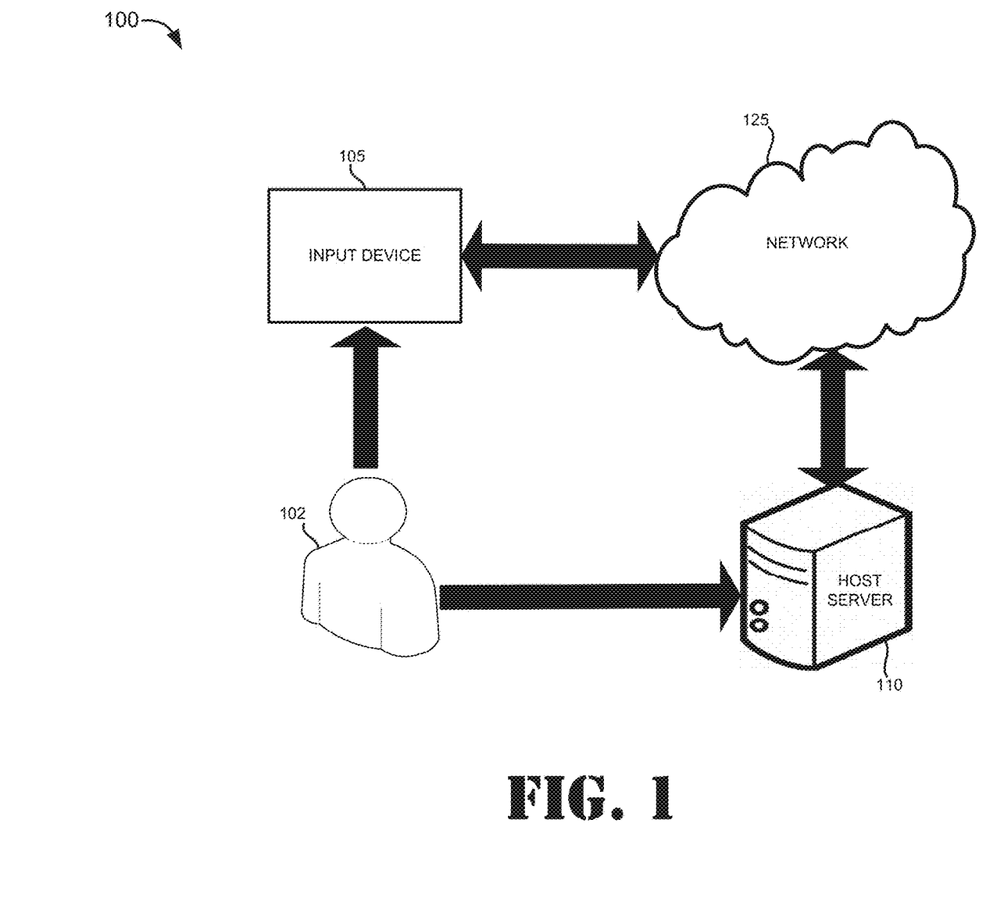
FIG. 1 is a simplified conceptual diagram of a surface wear determination system according to an example implementation.

Referring now in more detail to the drawings in which like numerals identify corresponding parts throughout the views, FIG. 1 is a simplified conceptual diagram of a surface wear determination system according to an example implementation. The system 100 includes an end user 102 in communication with an input device 105, a host server 110, and network 125.

End user 105 may represent an individual or device capable of interfacing with an input device 105. More particularly, the end user 102 represents any person or object capable of utilizing the surface determination platform and may include a vehicle owner, fleet management staff, or a device affixed onto a target vehicle. According to one implementation. The end user 102 interacts with input device 105 such as a smartphone, tablet, notebook personal computer or similar electronic device having an embedded camera or other image capture mechanism.

Furthermore, server 110 represents a host service provider configured to analyze surface wear information associated with a captured image. More particularly, and as will be described in further detail with reference to the figures below, the host server 110 may receive a captured image from the input device 105 via the network 125 and determine a surface wear value of the object while providing targeted marketing information to the end user 102.

Figure 2:
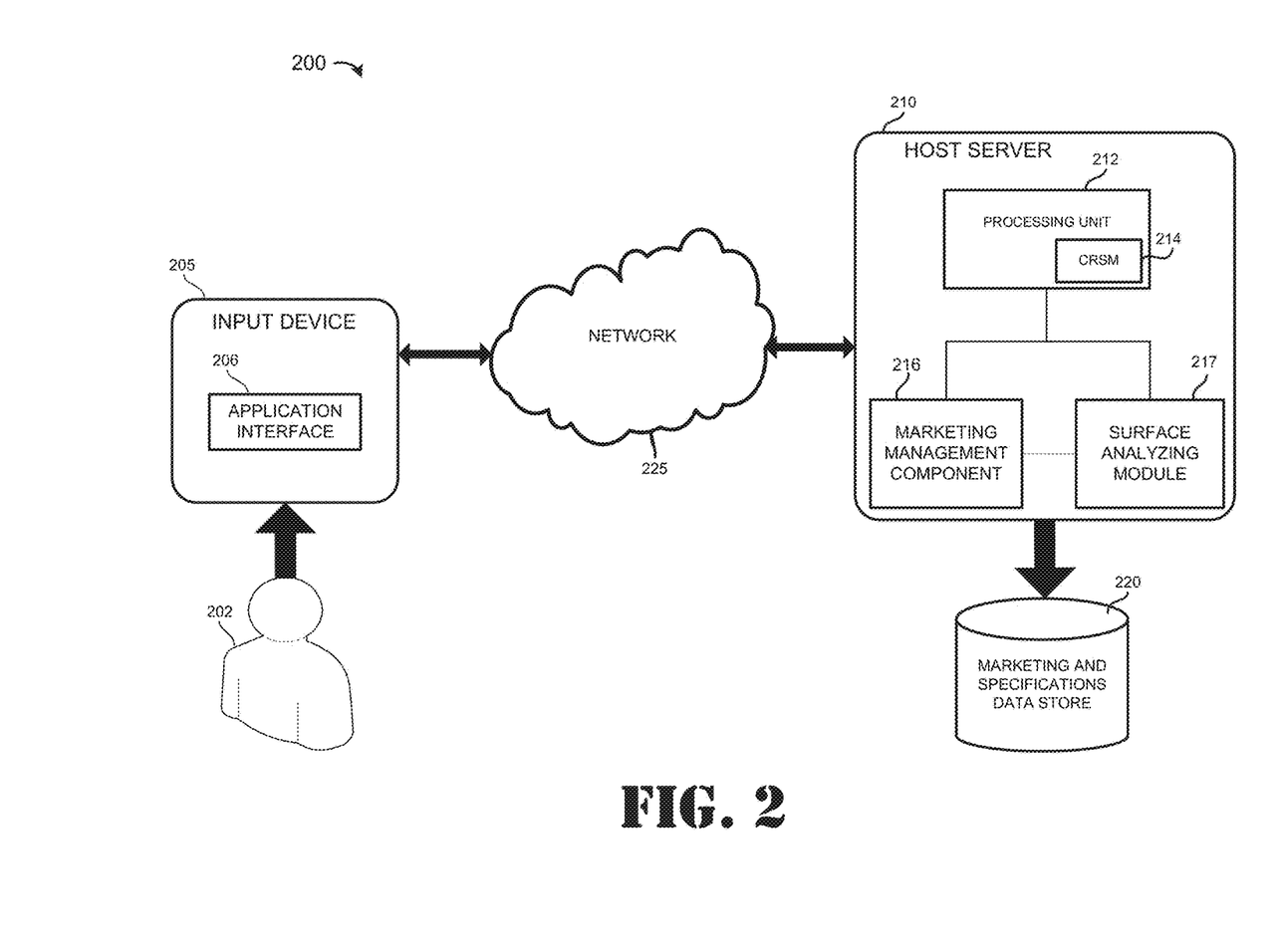
FIG. 2 is a simplified block diagram of the surface wear determination system according to an example implementation.

FIG. 2 is a simplified block diagram of the surface wear determination system according to an example implementation. Here, the system 200 includes an end user 202 and device 205, host server 210, and a marketing and specifications database 220.

As described above, the end user 202 represents a resource or entity including, but not limited, a vehicle owner, a fleet management staff, or a device attached to the vehicle. The end user 202 interacts with input device 205 via the interface application 206 to take pictures or videos of the target surface area of an object (e.g., tire surface). According to one implementation, the interface application 206 may be configured to capture a picture or video and transmit the captured media through network 225 to the host engine or service provider 210.

Service provider 210 represents a computing architecture having at least one computer system or host server, which may be operational with numerous other general purpose or special purpose computing system environments or configurations and may include, but is not limited to, personal computer systems, server computer systems, mainframe computer systems, laptop devices, multiprocessor systems, microprocessor-based systems, network personal computers, and distributed cloud computing environments that include any of the above systems or devices, and the like. Moreover, the host server provider system 210 may be described in the general context of computer system-executable instructions stored on a computer readable storage, such as program modules, being executed by a computer system. Also, the host server or service provider 210 communicates with the marketing and specifications database 220 and further includes a processing unit 212, marketing management component 216, and a surface analyzing module 217.

Processor 212 may be, at least one central processing unit (CPU), at least one semiconductor-based microprocessor, at least one graphics processing unit (GPU), other hardware devices suitable for retrieval and execution of instructions stored in machine-readable storage medium 214, or combinations thereof. For example, the processor 212 may include multiple cores on a chip, include multiple cores across multiple chips, multiple cores across multiple devices, or combinations thereof. Processor 212 may fetch, decode, and execute instructions to implement the approaches of the multi-currency payment system. As an alternative or in addition to retrieving and executing instructions, processor 212 may include at least one integrated circuit (IC), other control logic, other electronic circuits, or combinations thereof that include a number of electronic components for performing the requisite functionality.

Machine-readable storage medium 214 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 214 may be encoded with a series of executable instructions for determining personalized shop routing options.

The surface wear determination system of the present implementations is configured to determine wear patterns for, but not limited to tires, wheels, pulleys, belts, and similar materials conducive to wear over time. More particularly, the Surface Analyzing Module 217 of the host server 210 utilizes morphology algorithms, which are effective for image pattern detection and depth measurement, and are integrated into a single processing construct to determine tire baselines and wear values. According to one implementation, and as will be described in further detail with reference to FIGS. 3A-3D, the present system 200 utilizes a single set of equations and constructs to achieve pattern recognition of images and portions of images with respect to a tire such as the tread depth, tread width, and tread pattern. To this end, the Surface Analyzing Module 217 determines tire baseline and tire wear by utilizing morphology algorithms that provide an output orientation (e.g., degrees/scale) and histogram associated with the captured image. The histogram data associated with the image may then be compared with generated histogram data associated with object data and an object (e.g., original tire depth for a specific tire) within the manufacturer database so as to aid in determining the extent of surface wear.

Upon identification of the object, the Surface Analyzing Module 217 is further configured to orient the image for measurement processing and perform depth calculations of the surface (e.g., tire tread depth) based on known data (e.g., tire diameter). Certain manufacturing tire specifications such as tire diameter serve to provide supplemental tire information, in addition to the images or videos, for establishing the baseline and wear patterns for determining the surface wear condition of a tire or other object surface.

The Marketing Management Component 216 utilizes the surface wear data to determine relevant advertising and marketing campaigns for other vehicle products and services associated with the captured image and object surface. For instance, a loyalty and rewards programs and other discounted sale offerings may be presented to a user upon determining that their vehicle's tire has considerable surface wear and needs to be immediately replaced (e.g., surface wear value below manufacturer's recommended minimum threshold).

The Marketing and Specifications Database 220 stores relevant tire information, but not limited to tire manufacturer's specifications, tire wear information and related tire data such as tire tread width and tire tread pattern for example. The database 220 may also store advertising and marketing campaign information as it relates to enabling service offerings from external venders (e.g., loyalty and rewards programs). Still further, implementations of the present disclosure may be used to assess and monitor tire wear for vehicle fleets such that database 220 includes tire wear information along with fleet information as it relates to managing and monitoring tires associated with a fleet of vehicles.

In one example, the system 200 provides real-time and continuous monitoring of tire wear in the event the end user device captures pictures and/or video while attached to the vehicle. Moreover, the surface analyzing module and processing unit are configured to identify tire baselines and wear in a much more effective and integrated approach using a single processing construct. Implementations of the present disclosure can consistently and accurately determine tire tread pattern, width and depth, despite the fact that most tires are of the same color in addition to the wide-range of irregularities that manifest due to extreme wear and usage.

Figure 3A:
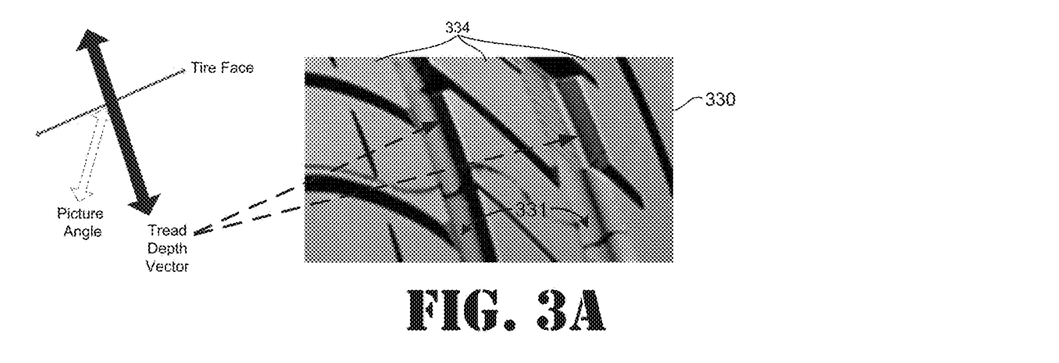
FIGS. 3A-3D are sample illustrations of the image processing steps for surface wear determination according to an example implementation.
Figure 3B:
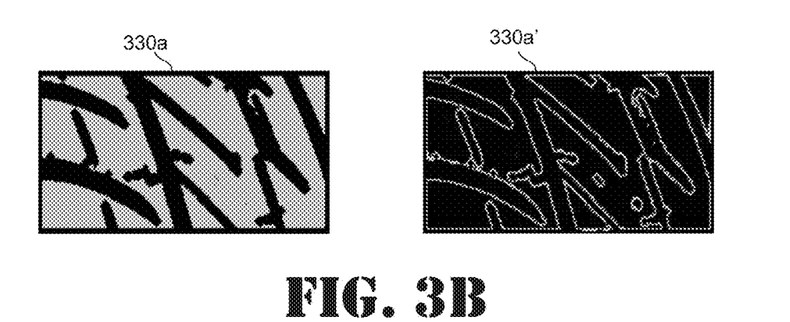

FIGS. 3A and 3B are sample illustrations of the image processing steps for surface wear determination according to an example implementation. As shown here, a captured image 330 includes surface data relating to a tire tread and pattern (e.g. Goodyear® F1 Eagle tire). Generally, treads on tires have repeating patterns embedded within the tire. The make, model, and/or year of a tire can be identified in part by assessment of the pattern style. Still further, a specific area of the tire surface (e.g., truck tire) may be imaged and matched against a database of truck-only tire patterns thus reducing the false positive rate on the basis of not including other tires that are not designed for trucks having similar tread patterns.

Treads 334 may be detectable by contrast due to the physical characteristics of the tread pattern. In the present example, treads 334 extend perpendicular from the base face of the tire (tread that does not protrude perpendicular will likely bend with pressure and wear unevenly) based on the camera angle used to capture the image as seen in FIG. 3A.

According to one implementation, the initial process to acquire the surface baseline includes generation of a monochromatic baseline image 330a, and several rounds of erosion so as to create a clear pattern image 330a' with no color gradient as shown in FIG. 3B. As shown here, the tread pattern in the image 330a will include all of the discrete pattern features that repeat over the face of the tire. By optimizing the level of erosion and dilation, application of morphological processes yields a more controlled image 330a that can be used to isolate the tread canals within an image of a tire face.

Each tread pattern may have a small or large area to process, but the distinction of the tread canals 331 for even a small image (as shown in FIG. 3A) are clearly noticeable through the imaging process. After identifying the tread canals 331, canals having varying gradients can be used to measure depth while some canals will be less likely to be used due to a lack of gradients for a typical image based on the angle used to capture the image. Through identification of at least two points appearing to have gradients, the user may select one or more points 327 to generate baseline histograms, which can be used to identify the tire in other images. Identification of the gradient target(s) 327 by the user may help in providing both a more accurate method of the gradient canal detection and an additional monochromatic image 330b' for establishing tread pattern analysis baselines.

Figure 3C:
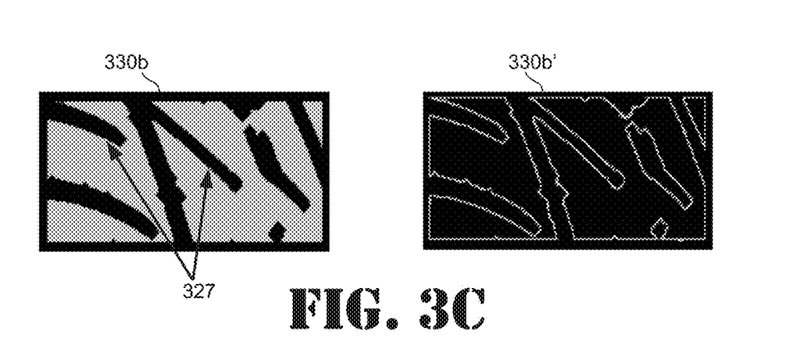
Figure 3D:
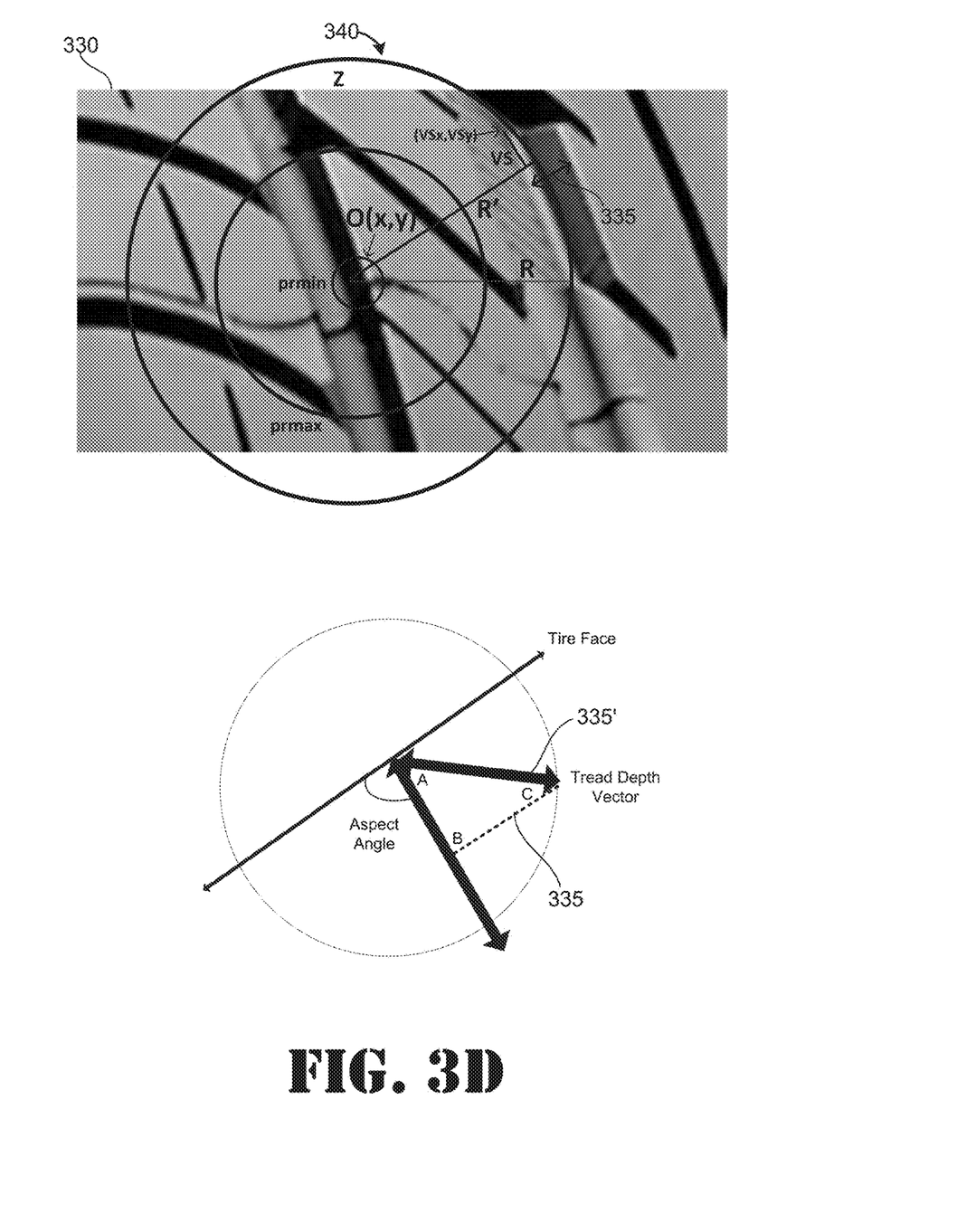

FIG. 3D shows the morphological histogram generation overlay 340. Though only one overlay is shown, two or more overlays may be used for each of the points that have gradients in the corresponding tread canal. The primary inputs relating to the identified tread canals in FIG. 3C may include the {X, Y} coordinate pair where the origin, O, of construct, Z, should overlay plane M of the image (i.e., origin, O, is a coordinate pair set as will be described in further detail below) as shown in overlay 340. Furthermore, the total area that is processed is based on the variables PRmin and PRmax (i.e., 0<PRmin<PRmax). In one example, these variables help define a minimum area set for PRmin and a maximum area set for PRmax. The surface analyzing module selects pixels within the image for tread depth measurement that lie within the identified boundaries. Since PRmax and PRmax are not merely boundaries but actual radii for the measurement of circles with origin O, the identified area set within the boundaries may be utilized for tread depth processing.

Analysis of the tread canal depth 335 requires first the identification of the tread pattern as discussed above. Data about the tire is accessed, and the system focuses on measuring a specific angle within the tread canal that is visually seen in the image in FIG. 3A. When measuring the tread canal, the tire must be identified (via histogram comparison) so that correct proportion and tread depth data are used, and the light and camera angle must be such that it is possible to differentiate the tread canal wall from the rest of the tread.

After the alignment of the baseline pattern with the image is performed, trigonometry and other standard geometric equations can be utilized to extrapolate the actual depth 335 of the tread canal. In one example, the surface analyzing module detects rotation and scale of the surface pattern as it resides in the image such that the image data is rotated and scaled to reflect the dimensions of the baseline pattern. Accordingly, wear of a tire for example will be properly computed given that the tire surface within the image has the correct angle so that contrast between tread and tire is clearly visible and thus measurable.

An accurate measurement may require a pixel to real-world distance mapping to be performed. Here, data from a scaled histogram may provide the relative size data needed to understand the image scale. If the image is smaller or larger by a significant factor, then the image may be scaled to reflect the factor thus mapping the size of the extracted tire image to the approximate size of the original baseline pattern.

The baseline tread pattern images 330a and 330b of FIGS. 3B and 3C may be used to create monochromatic baseline images 330a' and 330b for positioning the image such that data not associated with the tread canal can be removed from the target image, thus leaving a mapped location where a pixel measurement can be made. When creating the baseline for a tread, several data elements may be retrieved from the specification database which provide ease to calculate the actual tread depth including, but not limited to; tread depth for a new tire from a manufacturer and the width of tire tread.

Computing the actual three-dimensional tread depth from the captured image may require multiple measurement steps by the surface analyzing module. After identifying the pattern and orientation (via morphology algorithm), a function, which is aligned with the origin of the morphology comparison, is rotated based on the rotation of the image that is being processed. FIG. 3C depicts the origin of the function overlay 340 with the origin of the morphology equation origin (Origin, O, of PRMIN/PRMAX). A start angle (AS) and distance from start (DS) are contained by the function and direct, with an original orientation, a vector (VS) that originates at the origin or near the perceived tread depth 335 (near outer-boundary) and extends a specific distance (DS). The vector VS may be scaled to a scaling factor and rotated by application of the morphology function.

Using angle measurement and trigonometric equations, the actual depth vector 335' may be computed from the image. Initially, and in accordance with one example, the measurement function is aligned with the baseline image. For example, if origin (O) is 0,0 and the angle is 90 degrees and the tread length is 10, then a line stretches length 10 (in pixels) over the original overlay. In another example, if a surface wear pattern is matched by scale of 0.5 and rotation of 45 degrees counter-clockwise, then the vector, VS, may be rotated and sized accordingly. For example, the output vector may have angle of 45 degrees (90-45) and length of 5 (0.5*10).

In one implementation, the position of the end of vector VS may mark the beginning of the tread measurement in order to calculate the origin of measurement. For example, the coordinates for vector VS may be computed as follows:

End $X$ coordinate ($V\!Sx$) for $V\!S$=Sin($AS$)*$DS$+(Origin $X$)

End Y coordinate (VSy) for VS=Cos(AS)*DS+(Origin Y)

In the present example, the vector start position may be represented by origin (X,Y) and the vector end position calculated as coordinate pair (VSx,VSy). Thereafter, the tread canal bonds of measurement are calculated using the angle and origin defined as the end of the previous vector definition. For example, the length of measurement may be 25 pixels and the angle of measurement as 135 degrees. The points of measurement may be calculated using the perceived depth vector value 335, with each pixel being sampled in the source image. A scaling factor of 0.5 may be applied, for example, if the length of measure is 25 pixels in order to provide a sample measure of 12.5. Furthermore, due to lighting and camera angle concerns (e.g., based on the vertical and horizontal angles from the aperture that captures the image of the tire surface), each sampling may provide two sample measurements. And based on the orientation of the image with respect to the user/processor, a determination can be made to use the more accurate measurement of the two samples.

The actual size of the tire may also be utilized to determine the tread depth. The pattern detector which detects scale and rotation in a subset of the tire. The previously identified pattern, which is used to match the tire tread, is scaled through a defined scale value. For instance, if the pattern is 2.5 times smaller than the actual tire size, then it is defined accordingly such that each pixel of the image can be mapped to a specific measurement (tire tread is commonly measured in 32nds of an inch or millimeters). In order to provide the most accurate measurement, the aspect angle for the image may also be taken into consideration. Because the image may be captured at multiple angles with respect to the tire surface (e.g., 15 to 75 degrees), then to determine the actual length, the vertical and horizontal angle of the captured image may be calculated for error correction. For example, if the image was captured with a 45 degree angle horizontally (assuming the tire is vertical standing on the tread) and a 0 degree vertical angle (the camera is at the same elevation as the tire tread) the length must be rotated to account for the aspect incongruence.

As shown in FIG. 3D, the aspect angle or camera angle associated with the captured image 330 includes the perceived tread depth length 335. According to one implementation, the aspect angle is always formed perpendicularly (via vector AB) to the perceived tread depth length 335. Given the aspect angle and perceived depth vector 335, which together also provide angles A and B, angle C and the actual tread depth length AC (335') can be calculated by the surface analyzing system. More particularly, utilizing the techniques above, the surface analyzing module and processing unit may extrapolate the following dimensions from the captured image to calculate the actual tread life (i.e., surface wear value) of the tire surface:

| | |
|---|---|
| Tire Width/in - 10.9 | Min. Tread Depth/In. 3/32 |
| Image pix/in - 84.2 | Min. Tread Depth/pix 32nd in - 7.89 |
| Tread Depth/In. - 11/32 | Tread Wall/pix - 15 |
| Tread Depth/pix 32nd in. - 28.95 | Tread Wall image/in. - 0.178 |
| Tread Wall/32nd In. - 5.699 | Tread Life - 33.7% |

The remaining tread life may be computed as follows:

Total Possible Life=Original life−Minimum life;

Current life=Actual Life−Minimum Life;

Current Life/Total Possible Life=% Remaining Life

Furthermore, although a tire and tire wear are used in the present example, implementations are not limited thereto as the surface wear determination system may be used for other flexible and inflexible materials that undergo prolonged stress during use such as pulleys, belts, wheels, and the like.

Figure 4:
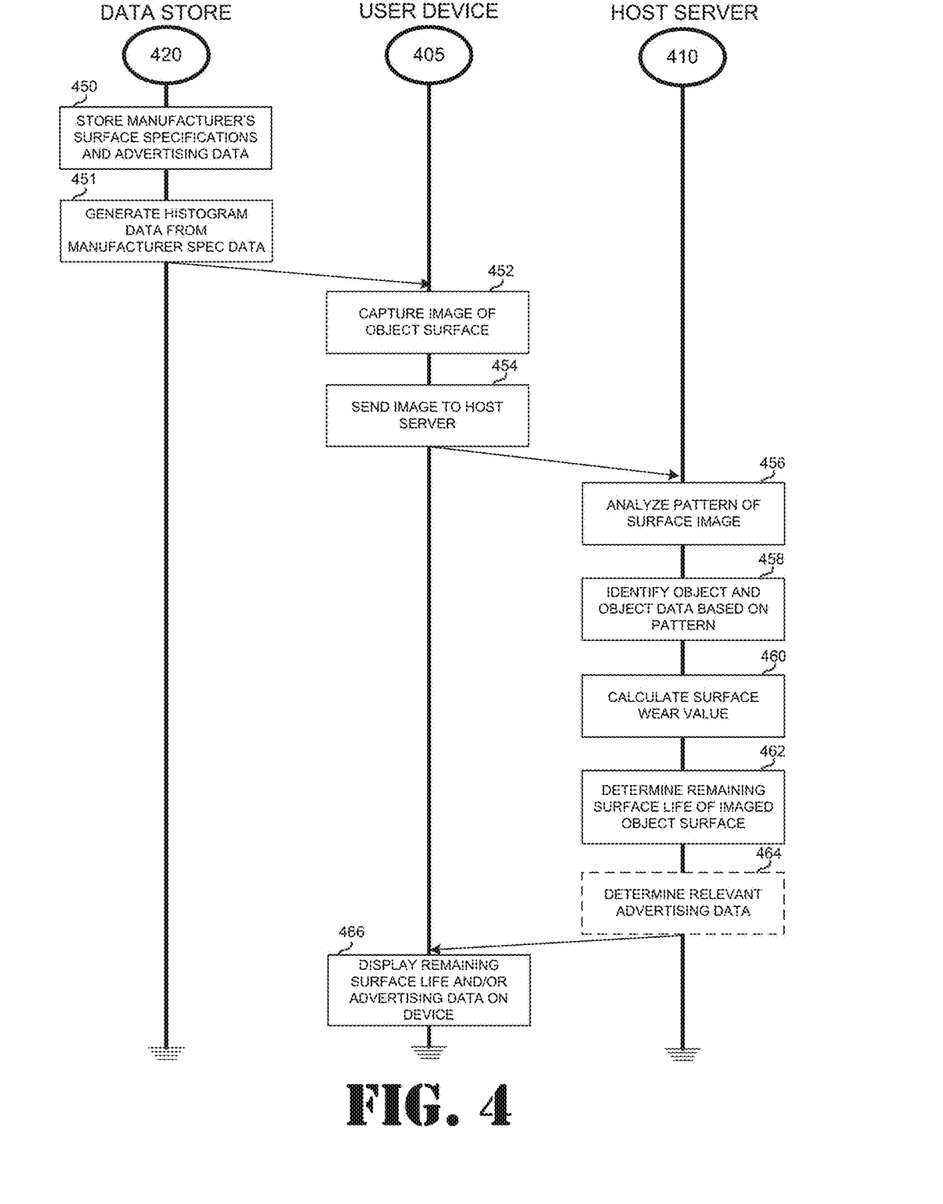
FIG. 4 illustrates a sequence diagram of the processing steps for surface wear determination according to an example implementation.

FIG. 4 illustrates a sequence diagram of the processing steps for surface wear determination according to an example implementation. In block 450, manufacturer specifications for a plurality of objects are stored along with the marketing and adverting data associated with one more vendors. For example, minimum tread depth specifications may be stored in the database through retrieval from public sources (e.g., internet) or through direct download/upload from a relevant vendor. In addition, minimum legal limits may be set as the threshold value for the surface wear depth. Marketing and advertising data may include rewards programs, discounts and similar information used to communicate sales of an object associated with the captured image and the user. In accordance with one example, histogram data relating to the manufacture specifications are then generated in block 451. For example, a graphical representation (or similar visual interpretation of numerical data) relating to stored pattern information of an object within the manufacturer database is generated by the processing unit. The end user and device 405 capture an image of an object surface in block 452. Next, the captured image is transmitted to the host service provider for determination of the surface wear. The image may be transmitted in block 454 automatically upon the picture being captured or manually uploaded by a user via an application running on the user device 405.

In block 456, the surface of the image is analyzed and a pattern is detected using morphology algorithms as discussed above for example. As mentioned with respect to FIGS. 3A-3D, a monochromatic threshold may be applied to the image including dilation, erosion or other morphological steps to generate, along with one or more points chosen by the user, baseline histogram data associated with the captured image. Thereafter, the object (e.g., tire) and object data (e.g., make, model, year, etc.) are identified based on the detected pattern in block 458. In one example, proper identification of the tread pattern may require the system to instruct the end user to confirm whether the object data is correct (e.g., make, model, and/or year data of a given tire are accurate). Furthermore, the database may then be queried to retrieve measurement data associated with the identified object so as to determine the minimum threshold value of surface wear for the target object. In block 460, the surface wear of the object is calculated and in block 462 the remaining surface life is computed by the surface analyzing module as discussed above with respect to FIGS. 3A-3D. For example, the minimum threshold surface value from the vendor or dealer database may be compared with the measured surface wear value. In one implementation, if the minimum tread life is less than the current tread life, then a determination is made that the tire is exceeded its remaining life value; or if the manufacturer's minimum tread life+ (10% of min tread life) is less than current tread life, a warning may be communicated that the user has 10% or less tread life remaining on their tire.

Next, marketing information is determined by the marketing management component in block 464. For example, if the surface wear value of the tire is less than ten percent, the system may return marketing information for the most recent sales so that the user may purchase replacement tires in the near future. On the other hand, if the surface wear value or remaining surface life is within a predetermine range (e.g., wear value is greater than thirty percent but less than fifty percent), then the marketing management component may search the database for the best tire sales occurring at a future time or within a certain period of time (e.g., best sales within the next six months). Lastly, in block 466, the remaining surface life and/or the most relevant marketing information are returned to the user for viewing (e.g., displayed on smartphone).

Figure 5:
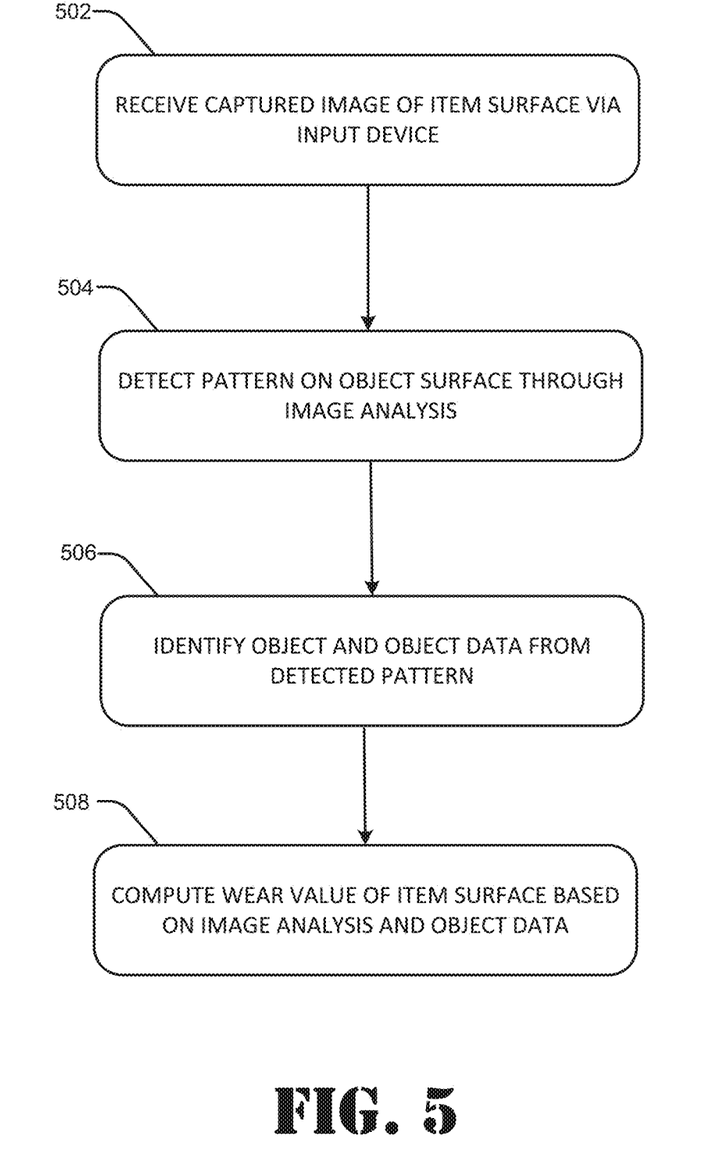
FIG. 5 illustrates a simplified flow chart of the processing steps for surface wear determination according to an example implementation.

FIG. 5 illustrates a simplified flow chart of the processing steps for surface wear determination according to an example implementation. In segment 502, an image of an object surface is captured by a camera or other optical sensor or input device and received by the processing unit of the host server. A surface pattern associated with the object is detected from the image in segment 504. Based on an analysis of the captured image including the detected pattern and histogram data, the host server and processing unit identify an object (tire make and model) and associated object data (e.g., tire diameter, minimum specifications) from the database in segment 506. In segment 508, the host server and processing unit compute a surface wear value of object surface based on the image analysis and the object data. For example, the actual size of the tire (tire diameter), as retrieved from the database, is used to scale the captured image for computing accurate measurements of the tread depth. The actual tread depth is compared with the manufacturers minimum threshold value to determine the surface wear value of the target object.

Figure 6:
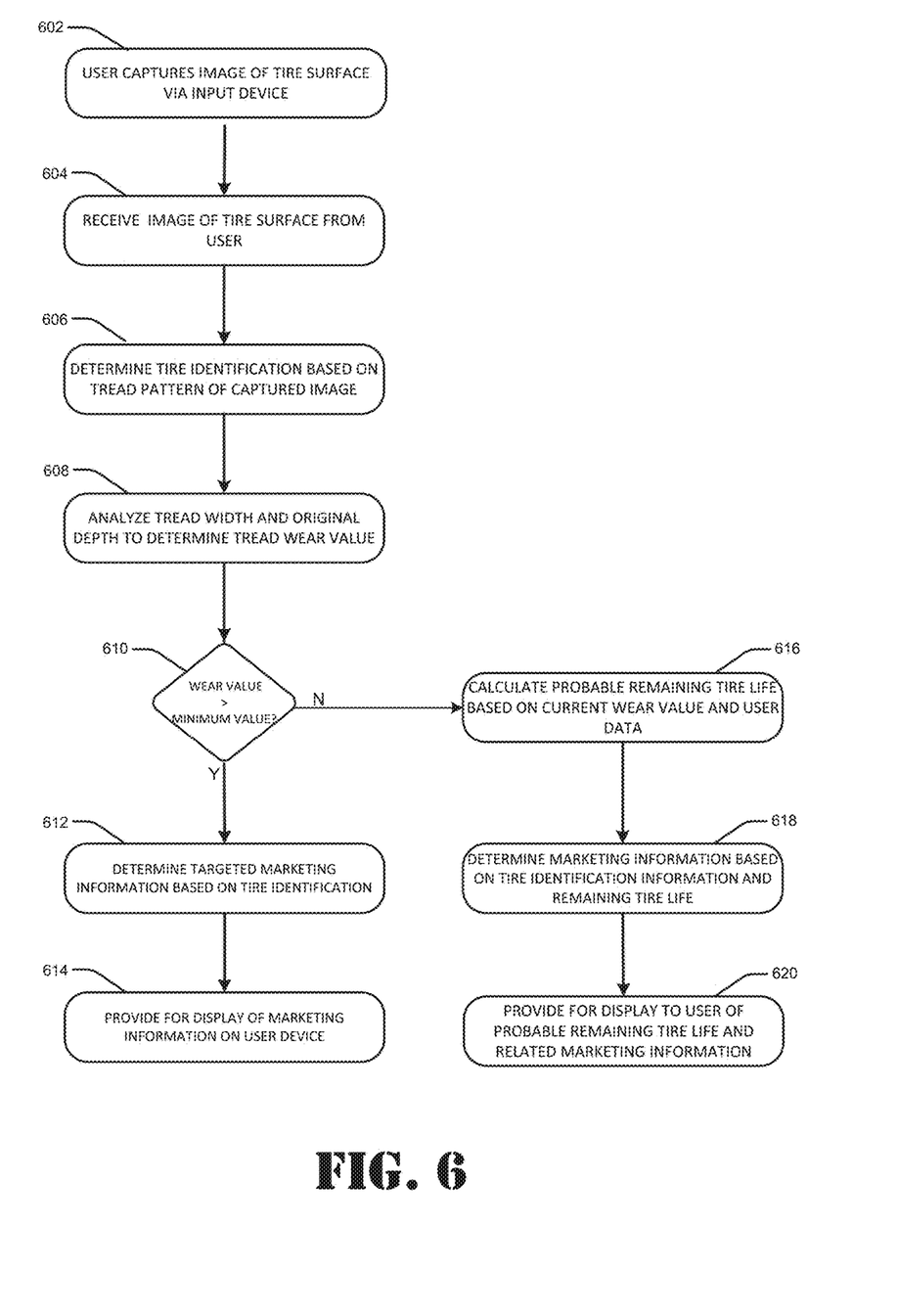
FIG. 6 illustrates another simplified flow chart of the processing steps for surface wear determination according to an example implementation.

FIG. 6 illustrates another simplified flow chart of the processing steps for surface wear determination according to an example implementation. In segment 602, the end user captures an image of the tire surface via an input device. Next, in segment 604, the captured image is transmitted and received at the host server over a network. Through detection and analysis (e.g., via morphology algorithms) of the image tread pattern, tire information such as the year, make, and model of the tire may be identified through comparison of histogram data in segment 606. For example, histogram data (visual representation of baseline tire pattern information) generated from baseline images and associated with the captured image may be compared with histogram data generated from the stored manufacturer data. More particularly, the closer the match between the image histogram information and the generated manufacturer histogram data, the more likely the imaged object corresponds with the object identified in the manufacturer database. Moreover, matching histogram data is advantageous over known methods as the disclosed identification step is faster as it requires less processing steps than prior solutions.

The tread wear percentage or surface wear value is then calculated in segment 608 based on the current depth measurement of the surface and stored object values (e.g., tire diameter) associated with the identified object. According to one example, the surface or pattern depth may first be measured after the image pattern is identified and extracted, and then an equation may be applied to map the range of possible depth values (e.g., from Min to Max) so as to calculate the current percentage of life remaining on the object surface (e.g., tread wear).

If the surface wear value is determined to be less than a minimum threshold value (e.g., less than 10 percent remaining life based on manufacturer's recommendation or state law) in segment 610, then targeted and relevant marketing information corresponding with the identified tire is retrieved from the database in segment 612. The targeted marketing information is then provided for display on the user device in step 614.

Similarly, if the wear value is determined to be greater than the minimum value, then a probable remaining life may be computed in segment 616 based on the surface wear value and user/driving information. For example, the annual mileage, weekly travel routes, road conditions along the most traveled route, geographic area/weather conditions, and similar factors that affect tire condition may be input into the system by an operating user or computed automatically via onboard vehicle sensors, and then used in the determination of the probable remaining life (i.e., miles or time frame before the tire reaches the minimum threshold value). Next, in segment 618, marketing information based on the identified tire and remaining probable life are determined by the host server and then provided for display on the user device in segment 620.

Implementations of the present disclosure provide a system and method for surface wear determination. Moreover, several advantages are afforded by the examples disclosed herein. For instance, the process of determining tire baselines and wear are computed automatically thereby eliminating the need for manual devices and processes that require detailed knowledge by the end user. Moreover, automating the surface wear determination process using portable devices such as smartphones and tablets allows for more efficient and reliable management of tires on fleet vehicles. Still further, the present configuration enables new aspects for marketing other vehicle products and services (e.g., loyalty and rewards programs) to customers based on the real-time wear conditions of objects.

Furthermore, while the disclosure has been described with respect to particular examples, one skilled in the art will recognize that numerous modifications are possible. Moreover, not all components, features, structures, characteristics, etc. described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that although some examples have been described in reference to particular implementations, other implementations are possible according to some examples. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method for determining surface wear comprising:
capturing an image of an object surface via an input device;
detecting a surface pattern from the captured image;
identifying object data associated with the object surface based on the surface pattern and histogram data for the captured image; and determining a surface wear value of the object surface based on the object data and the surface pattern, wherein a remaining tire life is calculated based on the surface wear value and a minimum tread life that is specified in the identified object data.

2. The method of claim 1,
wherein the identifying the object data includes retrieving the object data from a database based on the histogram data for the captured image, and
the determining the surface wear value includes measuring, via a host server, a current surface depth value of the object surface based the surface pattern and calculating, via the host server, the surface wear value based on the current depth value and the object data.

3. The method of claim 2, further comprising:
storing information relating to a plurality of objects in the database, and
generating histogram data for each of the plurality of objects based on the stored information;
wherein the identifying the object data includes comparing the histogram data associated with the captured image with the histogram data associated with the plurality of objects.

4. The method of claim 3, wherein the plurality of objects are tires and the object surface corresponds to the treading of a given tire.

5. The method of claim 4, further comprising:
calculating a current tread depth of the given tire based on the surface pattern;
wherein the surface wear value is based on the current tread depth and an original tread depth value that is specified in the identified object data.

6. The method of claim 4, further comprising:
providing targeted marketing information to a user associated with the object surface based on the determined surface wear value.

7. The method of claim 4, wherein the input device is attached to a vehicle so as to enable continuous monitoring of the tread wear value of a tire surface.

8. A system for surface wear determination comprising:
an input device to capture an image of an object surface;
a database to store information associated with a plurality of objects; and
a host server to:
analyze the captured image to identify a corresponding object from among the plurality of objects based on a detected surface pattern in the captured image and histogram data for the captured image, and
determine a surface wear value based on the surface pattern and the information that is associated with the corresponding object stored in the database, wherein a remaining tire life is calculated based on the surface wear value and a minimum tread life that is specified in the information that is associated with the corresponding object stored in the database.

9. The system of claim 8, wherein the database stores marketing information associated with a plurality of vendors, and
wherein the host server provides relevant marketing information to a user associated with the input device based on the determined surface wear value.

10. The system of claim 9, wherein the plurality of the objects are tires, the object surface corresponds to the treading of a given tire, and the surface pattern is a tire tread pattern.

11. The system of claim 10, wherein the host server is to calculate a current tread depth of the given tire based on the surface pattern, and
wherein the surface wear value is based on the calculated current tread depth and an original depth value that is specified in the information that is associated with the corresponding object.

12. The system of claim 10, wherein the host server is to determine the relevant marketing information based on the identity of the corresponding object tire identification and provide the relevant marketing information to the user when the surface value is less than a recommended value that is specified in the information that is associated with the corresponding object.

13. A non-transitory computer readable storage medium having stored executable instructions, that when executed by a processor, cause the processor to:
receive an image of a surface of a tire from an input device;
analyze the image to detect a tread pattern of the tire from histogram data for the image;
determine a current tread width of the tire based on the tread pattern and the tire information for the tire; and
calculate a tire wear value based on the current tread width and original depth information that is specified in the tire information for the tire, wherein a remaining tire life is calculated based on the tire wear value and a minimum tread life that is specified in the tire information for the tire.

14. The non-transitory computer readable storage medium of claim 13, wherein the instructions are to further cause the processor to:
provide marketing information when the remaining life of the tire is within a predetermined range of a minimum tread value specified in the retrieved tire information associated with the identified tire.

15. The non-transitory computer readable storage medium of claim 13,
wherein to detect the tread pattern of the tire, the instructions are further to cause the processor to determine the histogram data for the image, and
wherein to retrieve the tire information for the tire, the instructions are further to cause the processor to select the tire information for the tire from among tire information associated with multiple types of tires by comparing the histogram data for the image to histogram data associated with the multiple types of tires.

16. The non-transitory computer readable storage medium of claim 13,
wherein the instructions are to further cause the processor to:
determine content of targeted marketing information to be sent to the input device based on the tire wear value.

17. The non-transitory computer readable storage medium of claim 13,
wherein the instructions are to further cause the processor to:
send targeted marketing information to the input device based on a determination that the tire wear value satisfies a thresholding criterion.

* * * * *